United States Patent [19]  [11] 3,714,109
Matherly et al.  [45] Jan. 30, 1973

[54] PRIMER ADHESION PROMOTER AND PRIMER COMPOSITION

[75] Inventors: James E. Matherly, Elizabethtown, Ky.; William R. Hays, Midland, Mich.

[73] Assignee: Dow Corning Corporation, Midland, Mich.

[22] Filed: June 24, 1971

[21] Appl. No.: 156,550

[52] U.S. Cl. ............ 260/32.8 SB, 260/33.6 SB, 260/33.8 SB, 260/46.5 H

[51] Int. Cl. ............................................. C08g 51/34

[58] Field of Search ....260/32.8 SB, 33.6 SB, 46.5 H; 117/75

[56] References Cited

UNITED STATES PATENTS 3,619,255   11/1971   Lengnick ............................. 117/75

Primary Examiner—Lewis T. Jacobs
Attorney—Robert F. Fleming, Jr. et al.

[57] ABSTRACT

A mixture of an organosiloxane of four to 20 silicon atom and containing at least three silicon-bonded hydrogen atoms and a modified organosiloxane of five to 21 silicon atoms and containing an average of one unit of $(CH_3COO)_3SiCH_2CH_2(CH_3)SiO$ or $(CH_3COO)_3iCH_2CH_2(CH_3)_2SiO$ and at least two silicon-bonded hydrogen atoms is an adhesion promoter in primer compositions for adhering silicone elastomers to substrates.

10 Claims, No Drawings

PRIMER ADHESION PROMOTER AND PRIMER COMPOSITION

This invention relates to an organosiloxane mixture which is an adhesion promoter for primer compositions and to a primer composition containing said adhesion promoter.

The adhesion of silicone elastomers to substrates, such as metals, glass, paper, wood, masonry, stone and the like is of significant importance to the spectrum of utility of the silicone elastomers. Although some silicone elastomers adhere to some substrates, not all silicone elastomers adhere to all substrates. Furthermore, those silicone elastomers which do adhere to some substrates often have adhesive strengths which limit their utility. The adhesion of a silicone elastomer to a substrate can be enhanced by priming the substrate with a primer composition. Some primers are specific to the elastomer, some primers are specific to the substrate and some primers are operable only under certain set conditions.

It is, therefore, an object of the present invention to provide an adhesion promoter for primer compositions which is useful for bonding silicone elastomers to substrates and which combinations retain adhesion effectiveness under thermal aging and hydrolytic aging. This and other objects will become apparent from the following detailed description.

This invention relates to a mixture under anhydrous conditions consisting essentially of (A) an organosiloxane having an average of from four to 20 inclusive silicon atoms per molecule, organosiloxane units bonded together through silicon-oxygen-silicon bonds and selected from the group consisting of dimethylsiloxane units and dimethylhydrogensiloxane units, there being present an average of at least three siliconbonded hydrogen atoms per molecule, and (B) a modified organosiloxane having an average of from five to 21 silicon atoms per molecule, organosiloxane units bonded together through silicon-oxygen-silicon bonds and selected from the group consisting of dimethylsiloxane units, methylhydrogensiloxane units, $(CH_3COO)_3SiCH_2CH_2(CH_3)SiO$ units, trimethylsiloxane units, dimethylhydrogensiloxane units and $(CH_3COO)_3SiCH_2CH_2(CH_3)_2SiO_{0.5}$ units, there being present an average of at least two silicon-bonded hydrogen atoms per molecule and an average of one siloxane unit selected from the group consisting of $(CH_3COO)_3SiCH_2CH_2(CH_3SiO$ units and $(CH_3COO)_3SiCH_2CH_2(CH_3)_2SiO_{0.5}$ units, said mixture having from 15 to 80 mol percent modified organosiloxane (B) where (A) and (B) are 100 mol percent.

The adhesion promoter mixture can readily be prepared by mixing organosiloxanes having at least three silicon-bonded hydrogen atoms and from four to 20 silicon atoms with the appropriate amount of vinyltriacetoxysilane in the presence of a platinum catalyst. The reaction can also be carried out without using a platinum catalyst by heating the reaction mixture at temperatures of from 140° to 160°C. for 1 to 4 hours. The vinyl group on the vinyltriacetoxysilane reacts with the silicon-bonded hydrogen atoms to form an adduct represented by $(CH_3COO)_3SiCH_2CH_2Si\equiv$. The reaction mixture is preferably heated at a temperature of 80°C. to 120°C. for from thirty minutes to two hours to provide the adduct. The reaction should be carried out under anhydrous conditions, however, small amounts of condensation from minute amounts of moisture in the reaction mixture are not usually detrimental to the final adhesion promoter mixture.

The amount of vinyltriacetoxysilane reacted with the organosiloxane (A) containing the silicon-bonded hydrogen atoms is sufficient to provide from 15 to 80 mol percent modified organosiloxane (B) wherein (A) and (B) are 100 mol percent. The preferred amount of modified organosiloxane (B) is from 25 to 80 mol percent.

The organosiloxane (A) contains at least three siliconbonded hydrogen atoms per molecule and from four to 20 silicon atoms. The organosiloxane contains organosiloxane units bonded through silicon-oxygen-silicon bonds where the units can be dimethylsiloxane units, methylhydrogensiloxane units, dimethylhydrogensiloxane units or trimethylsiloxane units. The organosiloxane (A) can contain any of the combinations of organosiloxane units such that there are at least three silicon-bonded hydrogen atoms per molecule and from four to 20 silicon atoms. The organosiloxane compounds of (A) can be illustrated by $[(CH_3)HSiO]_4$, $[(CH_3)HSiO]_5$, a copolymer containing two units of trimethylsiloxane, five units of methylhydrogensiloxane and three units of dimethylsiloxane, a copolymer containing two units of dimethylhydrogensiloxane, three units of methylhydrogensiloxane and five units of dimethylsiloxane, a copolymer of two units of trimethylsiloxane, seven units of methylhydrogensiloxane and eleven units of dimethylsiloxane, a copolymer of two units of trimethylsiloxane and eighteen units of methylhydrogensiloxane, a copolymer of two units of trimethylsiloxane and three units of methylhydrogensiloxane, and a copolymer of two units of dimethylhydrogensiloxane, ten units of methylhydrogensiloxane and two units of dimethylsiloxane. The number of siloxane units in the copolymers are the average number per molecule. The organosiloxanes (A) are well known in the art.

The modified organosiloxanes (B) are prepared as described above and are derived by reacting part of the organosiloxanes with vinyltriacetoxysilane. The modified organosiloxanes (B), therefore, are the organosiloxanes (A) where some of the silicon-bonded hydrogen atoms have been replaced by $(CH_3COO)_3SiCH_2CH_2-$. Therefore, organosiloxane (B) contains one more silicon atom per molecule than its precuser and the average number of silicon atoms per molecule is 5 to 21. The organosiloxane (B) therefore contains organosiloxane units selected from dimethylsiloxane units, trimethylsiloxane units, methylhydrogensiloxane units, dimethylhydrogensiloxane units, $(CH_3COO)_3SiCH_2CH_2(CH_3)SiO$ and $(CH_3COO)_3SiCH_2CH_2(CH_3)_2SiO_{0.5}$. The organosiloxane (B) contains an average of at least two units having silicon-bonded hydrogen atoms and an average of one unit of $(CH_3COO)_3SiCH_2CH_2(CH_3)SiO$ and $(CH_3COO)_3SiCH_2CH_2(CH_3)_2SiO_{0.5}$. The following compounds illustrate the organosiloxane (B) compounds.

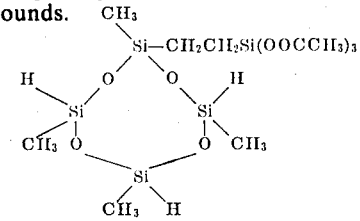

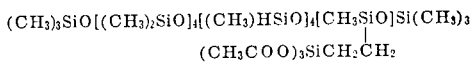

and

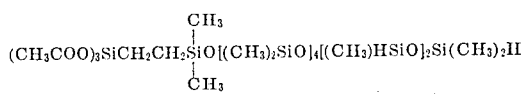

There may be some molecules of organosiloxane (B) which have two units of the adduct. However, since the ratio of organosiloxane containing the silicon-bonded hydrogen atoms to vinyltriacetoxysilane is in favor of only one adduct per molecule, there will not be large amounts of such molecules. The adhesion promoter mixture can include such amounts of molecules with two adduct units.

The adhesion promoter mixture defined above can be used in preparing primers as defined hereinafter. The adhesion promoter mixture however can also be used as an adhesion promoter and crosslinker in room temperature vulcanizable silicone elastomer compositions as described by William H. Clark and William R. Hays in an application filed concurrently herewith, Ser. No. 156,551, filed June 24, 1971 and entitled "Silicone Elastomer with Unprimed Adhesion". Clark and Hays describe a curable composition comprising a vinyldiorganosiloxane endblocked polydimethylsiloxane and the adhesion promoter mixture as described herein. The composition can be catalyzed by a platinum catalyst and may contain fillers and pigments.

The primers can be prepared by mixing under essentially anhydrous conditions 1 part by weight of bis(acetylacetonyl)diisopropyltitanate, 0.5 to 10 parts by weight of an alkylpolysilicate selected from the group consisting of ethylpolysilicate propylpolysilicate and mixtures thereof, 0.5 to 10 parts by weight of the adhesion promoter mixture described herein and 5 to 85 parts by weight of an organic solvent selected from the group consisting of ketones, halogenated hydrocarbons and hydrocarbons all having boiling points no greater than 150°C.

The primer composition of this invention is specific to bis(acetylacetonyl)diisopropyltitanate. Other organic titanates such as tetraalkyl titanates were found to cause reaction of the mixture in storage after short periods of time under anhydrous condition resulting in a mixture which had no priming ability. The bis(acetylacetonyl)diisopropyltitanate, ethylpolysilicate, propylpolysilicate and the organic solvents can be purchased commercially.

The organic solvents are those which have boiling points no greater than 150°C. and include ketones such as acetone, methylethylketone, methylisobutylketone, methylpropylketone, diethylketone, methyl-n-butylketone, ethylpropylketone, dipropylketone and butylethylketone; hydrocarbons such as hexane, pentane, heptane, octane, light naphthas and benzene and halogenated hydrocarbons such as chlorothene, carbon tetrachloride, trichloroethylene, perchloroethylene, monochlorobenzene and trichlorotrifluoroethane.

Although the order of mixing is not critical, the best results are obtained if the bis(acetylacetonyl)diisopropyltitanate is added last, preferably dissolved in part of the organic solvent. The primer composition should be stored under anhydrous conditions until used, since the ingredients are moisture sensitive.

The primer compositions of the present invention are useful for adhering silicone elastomer to a substrate. Particularly excellent results are obtained where the silicone elastomer is an adhesive room temperature vulcanizable silicone elastomer which cures through the reaction of a silicon-bonded vinyl radical and a silicon-bonded hydrogen atom in the presence of a platinum catalyst. These silicone elastomers are well known in the art and are available commercially.

The substrates can include metals such as aluminum, stainless steel, copper, titanium, and carbon steel and glass. The present invention also relates to an integral combination of a cured silicone elastomer and a substrate selected from metal and glass having the primer composition defined above at the interface therebetween which forms a combination which has stable adhesion once the silicone elastomer is cured.

The primer composition can be applied to the substrate by any convenient means such as spraying or wiping. The primer composition is then allowed to air dry prior to the application of the silicone elastomer. The silicone elastomer can be either cured at room temperature or heat vulcanized. The primer compositions of the present invention are clear and thus for convenience, a dye can be added to assist the user so that he knows where the primer has been applied.

The primer provides integral combinations of silicone elastomer and substrates which retain their adhesion after both thermal aging and hydrolytic aging.

The following examples are for illustrative purposes and should not be construed as limiting the present invention which is properly delineated in the claims.

EXAMPLE 1

The following mixtures were prepared by mixing the ingredients and heating under essentially anhydrous conditions for one hour at 100°C. in the presence of a catalytic quantity of a platinum catalyst.

A. 600 parts by weight of an organosiloxane containing per molecule an average of two dimethylhydrogensiloxane units, five dimethylsiloxane units and three methylhydrogensiloxane units, and 58 parts by weight of vinyltriacetoxysilane.

B. 600 parts by weight of the organosiloxane defined in (A) above, and 90 parts by weight of vinyltriacetoxysilane.

C. 600 parts by weight of the organosiloxane defined in (A) above, and 120 parts by weight of vinyltriacetoxysilane.

D. 600 parts by weight of the organosiloxane defined in (A) above, and 160 parts by weight of vinyltriacetoxysilane.

The above reacted mixtures contained modified organosiloxane molecules which contained siloxane units of the formula $(CH_3COO)_3SiCH_2CH_2(CH_3)SiO$ and $(CH_3COO)_3iCH_2CH_2(CH_3)_2SiO_{0.5}$. The mol percentage of such modified organosiloxane molecules in the mixture was 28 for (A), 44 for (B), 59 for (C), and 79 for (D).

A primer mixture was prpared by combining under anhydrous conditions 50 parts by weight acetone, 5 parts by weight ethylpolysilicate, 5 parts by weight bis(acetylacetonyl)-diisopropyltitanate and 5 parts by weight of resulting mixture of (B) above.

Aluminum panels and screens were cleaned with a commercial scouring powder, rinsed with water and then acetone. After the panels and screens dried, the primer was coated on the panels and screens and allowed to air dry for 30 minutes. The primed panels and screens were then used for adhesion tests in accordance with Military Specification 7502, without immersion. A silicone elastomer was prepared by mixing 100 parts by weight of a methylphenylvinylsiloxy endblocked polydimethylsiloxane having a viscosity of 2,000 cs. at 25°C., 100 parts by weight of ground quartz (5 micron), 6 parts by weight fume silica filler, 4 parts by weight of a hydroxyl endblocked polymethylphenylsiloxane fluid, 1 part by weight of carbon black, a catalytic quantity of a platinum catalyst and 2 parts by weight of an organosiloxane containing per molecular an average of two trimethylsiloxane units, five methylhydrogensiloxane units and three dimethylsiloxane units. The silicone elastomer was coated on panels in accordance with the above test procedure and cured for one hour at 150°C. The peel strength was 4.5 pounds with 100 percent cohesive failure. Repeating the test, except the silicone elastomer was cured for 24 hours at room temperature, the peel strength was 5.5 pounds with 100 percent cohesive failure. The peel strength after 48 hours at room temperature was 5 pounds with 100 percent cohesive failure. A control run without any primer resulted in no adhesion to the panels. Primers prepared from the mixtures (A), (C) and (D) gave equivalent adhesion results.

EXAMPLE 2

The following primer compositions were prepared by mixing the ingredients under anhydrous conditions:

A. 10 parts by weight of acetone, 1 part by weight of the mixture of (B) in Example 1, 1 part by weight of ethylpolysilicate, and 1 part by weight of bis(acetylacetonyl)diisopropyltitanate.

B. Same as (A) above except methylisobutylketone was used in place of acetone.

C. Same as (A) above except chlorothene was used in place of acetone.

Three aluminum panels were cleaned with a commercial scouring powder, rinsed with water, dried with a towel, rinsed with acetone and air dried. Three aluminum panels were used without cleaning. The aluminum screens in all cases were cleaned with a commercial scouring powder, rinsed with water and then acetone. Each of the above primers were applied to a cleaned panel and a panel not cleaned and tested for adhesion by the procedure described in Example 1. The silicone elastomer was prepared by combining 100 parts by weight of the polydimethylsiloxane described in Example 1, 93 parts by weight of ground quartz (5 micron), 4 parts by weight of fume silica filler, 3 parts by weight of a hydroxyl endblocked polymethylphenylsiloxane fluid, 5 parts by weight of titanium dioxide, a catalytic quantity of a platinum catalyst and 1 part by weight of the organosiloxane as described in the elastomer composition of Example 1. The silicone elastomer was cured by heating 1 hour at 150°C. In all cases the peel strength was 4 pounds with 100 percent cohesive failure. A control run without primer gave no adhesion.

EXAMPLE 3

Three aluminum panels were cleaned, primered with the primer (A) of Example 2, coated with the silicone elastomer of Example 2 and tested for adhesion by the procedure described in Example 1. The time allowed for the primer to dry was varied and the silicone elastomer was cured by allowing it to remain at room temperature for 24 hours. The results were as shown in Table I below:

TABLE I

| Primer Dry Time, Minutes | Peel Strength, Pounds | % Cohesive Failure |
| --- | --- | --- |
| 1 | 4.5 | 80 |
| 5 | 5.5 | 95 |
| 15 | 5.5 | 100 |

EXAMPLE 4

Adhesion tests were made by using the silicone elastomer of Example 2, the primer of Example 2, (A) and the primer of Example 2, (A) with 0.00015 part by weight of Rhodamine B Dye added. Cleaned aluminum panels and screens were used as described in Example 2 and the silicone elastomer was cured at 150°C. for one hour in one case and at room temperature for 24 hours in another case. The silicone elastomer cured at 150°C. had a peel strength of 6 pounds with 100 percent cohesive failure for the primer without the dye and 4.5 pounds with 100 percent cohesive failure with the dye. The silicone elastomer cured at room temperature had 6 pounds peel strength with 100 percent cohesive failure for both primers.

The above adhesion tests were repeated except the primer was applied by spraying from an aerosol container. The primer without the dye had 4.5 pounds peel strength with 100 percent cohesive failure when the elastomer was cured at 150°C. for 1 hour and 6 pounds peel strength with 100 percent cohesive failure when the elastomer was cured for 24 hours at room temperature. The primer with the dye had 4.5 pounds peel strength with 100 percent cohesive failure when the silicone elastomer was cured either at 150°C. for 1 hour or at room temperature for 24 hours.

EXAMPLE 5

The primer containing the dye in Example 4 was applied as indicated in Table II on aluminum panels and screens. The panels and screens which were cleaned used the cleaning procedure of Example 2. The adhesion tests procedure as described in Example 1 was used. The silicone elastomer was prepared by combining 40.36 parts by weight of a methylphenylvinylsiloxy endblocked polydimethylsiloxane having a viscosity of 2,000 cs. at 25°C., 21.93 parts by weight of a methylphenylvinylsiloxy endblocked polydimethylsiloxane having a viscosity of 10,000 cs. at 25°C., 1.08 parts by weight of a hydroxyl endblocked polydimethylsiloxane fluid, 25.84 parts by weight of a reinforcing silica filler having the surface treated with trimethylsiloxy groups, 7.24 parts by weight of a benzene soluble siloxane resin having $SiO_2$ units, trimethylsiloxane units, dimethylvinylsiloxane units, 0.04 weight percent hydroxyl radicals and 2.7 weight percent dimethylvinylsiloxane units, 0.025 part by weight of methylvinylsiloxane cyclics, a catalytic quantity of a platinum catalyst and 5.43 parts by weight of an organosiloxane having per molecule an average of two trimethylsiloxane units, five methylhydrogensiloxane units and three dimethylsiloxane units. The silicone elastomer was cured as described in Table II. The adhesion test results were as shown in Table II.

TABLE II

| Panel No. | Priming procedure | Cure conditions | Peel strength, pounds | Percent cohesive failure |
|---|---|---|---|---|
| 1 | Cleaned, wiped with primer. | 24 hours at room temperature. | 48 | (1) |
| 2 | Uncleaned, wiped with primer. | do | 45 | (1) |
| 3 | Uncleaned, sprayed with primer. | do | 35 | (1) |
| 4 | Cleaned, wiped with primer. | 1 hour at 150° C | 40 | (1) |
| 5 | Uncleaned, wiped with primer. | do | 40 | (1) |
| 6 | Uncleaned, sprayed with primer. | do | 25 | 50 |

1 Screen ruptured, silicone elastomer and adhesive bond therefore stronger than screen.

EXAMPLE 6

The primer and silicone elastomer of Example 5 was used to determine the adhesion to various substrates as defined in Table III. The adhesion test procedure as described in Example 1 was used except steel strips were used in place of the aluminum screens. The adhesion results were as shown in Table III when the silicone elastomer was cured for 1 hour at 150°C. Equivalent adhesion results were obtained when the silicone elastomer was cured at room temperature.

TABLE III

| Substrate | Peel Strength, Pounds | % Cohesive Failure |
|---|---|---|
| Glass | 110 | 100 |
| Copper | 100 | 100 |
| Stainless Steel | 80 | 100 |
| Titanium | 100 | 100 |
| Carbon Steel | 100 | 100 |

EXAMPLE 7

The primer of Example 2 was used except 0.005 part by weight Rhodamine B Dye was added. The silicone elastomer was cured at room temperature for 24 hours, and steel strips and uncleaned aluminum panels were used in the adhesion test procedure as described in Example 6. The adhesion test assembly was aged in an oven at 232°, 260° and 316° for the times stated in Table IV prior to determining the peel strength and percentage cohesive failure. The results were as shown in Table IV.

The silicone elastomer was prepared by combining 633 parts by weight of a methylphenylvinylsiloxy endblocked polydimethylsiloxane having a viscosity of 2,000 cs. at 25°C., 262 parts by weight of a reinforcing silica filler having the surface treated with trimethylsiloxy groups, a catalytic quantity of a platinum catalyst, 10 parts by weight of zinc oxide, 5 parts by weight of carbon black, 1.2 parts by weight of methylvinylsiloxane cyclics and 38.2 parts by weight of an organosiloxane having per molecule and average of two trimethylsiloxane units, five methylhydrogensiloxane units and three dimethylsiloxane units.

TABLE IV

| | At 232°C. | | At 260°C. | | At 316°C. | |
|---|---|---|---|---|---|---|
| Days at Temp. | Peel Strength, Pounds | % Cohesive failure | Peel Strength, Pounds | % Cohesive failure | Peel Strength, Pounds | % Cohesive failure |
| Initial | 60 | 100 | 80 | 100 | 100 | 100 |
| 1 | 64 | 100 | 88 | 100 | 8 | 0 |
| 3 | 88 | 100 | 64 | 100 | 1.75 | 100 |
| 7 | 80 | 100 | 65 | 100 | — | — |
| 14 | 80 | 100 | 60 | 100 | — | — |

EXAMPLE 8

The primer and silicone elastomer of Example 5 was used in this test procedure where the substrates were varied as shown in Table V. The adhesion test procedure described in Example 6 was used. The peel strengths and percentage cohesive failures were determined after the test panels were primed, silicone elastomer coated and the silicone elastomer cured, were soaked in water at room temperature for the time specified in Table V. The results were as shown in Table V.

TABLE V

| | Initial | | After 24 hours | | After 72 hours | | After 1 week | |
|---|---|---|---|---|---|---|---|---|
| Substrate | Peel strength, pounds | Percent cohesive failure | Peel strength, pounds | Percent cohesive failure | Peel strength, pounds | Percent cohesive failure | Peel sterngth, pounds | Percent cohesive failure |
| Stainless steel | 80 | 100 | 122 | 100 | 120 | 100 | 60 | 40 |
| Copper | 100 | 100 | 134 | 100 | 135 | 100 | 120 | 100 |
| Titanium | 100 | 90 | 40 | (1) | 60 | (1) | 40 | (1) |
| Glass | 110 | 100 | 55 | (1) | | | 80 | 80 |
| Carbon steel | 100 | 90 | 72 | (1) | 80 | (1) | 80 | 100 |
| Aluminum 2 | 100 | 100 | 135 | 100 | 80 | 100 | 85 | 100 |

1 Steel strip separated from elastomer before failure at panel silicone elastomer interface.
2 The silicone elastomer used with the aluminum panel here was prepared by combining 111.5 parts by weight of a methylphenylvinylsiloxy endblocked polydimethylsiloxane having a viscosity of 2,000 cs. at 25° C., 15 parts by weight of a methylphenylvinylsiloxy endblocked polydimethylsiloxane having a viscosity of 400 cs. at 25° C., 40 parts by weight of a trimethylsiloxy treated fume silica filler, 2 parts by weight of zinc oxide, 4 parts by weight of titanium dioxide, a catalytic quantity of a platinum catalyst, 0.16 part by weight of methylvinylsiloxane cylics and 4.5 parts by weight of an organosiloxane having per molecule an average of two trimethylsiloxane units, five methylhydrogensiloxane units and three dimethylsiloxane units.

The same materials were used as described above except the peel strengths and percentages cohesive failures were determined after the test panels were primed, siloxane elastomer coated and siloxane elastomer cured, were exposed in a humidity cabinet which was at 37.8°C. and at 100 percent relative humidity for the length of time specified in Table VI. The results were as shown in Table VI.

TABLE VI

| Substrate | Initial Peel Strength, lbs. | % Cohesive failure | After 1 week Peel Strength, lbs. | % Cohesive failure | After 2 weeks Peel Strength, lbs. | % Cohesive failure |
|---|---|---|---|---|---|---|
| Stainless Steel | 80 | 100 | 90 | 100 | 50 | * |
| Carbon Steel | 100 | 100 | 80 | 100 | 85 | 100 |
| Copper | 100 | 100 | 100 | 100 | 100 | 100 |
| Titanium | 100 | 100 | 120 | 100 | 140 | 100 |
| Aluminum** | 100 | 100 | 80 | 100 | 60 | 100 |

EXAMPLE 9

The following mixtures were prepared by mixing the ingredients and heating under anhydrous conditions 1.5 hours at 100°C. in the presence of a catalytic quantity of a platinum catalyst.
  A. 600 parts by weight of an organosiloxane containing per molecule an average of two trimethylsiloxane units, five methylhydrogensiloxane units and three dimethylsiloxane units, and 58 parts by weight of vinyltriacetoxysilane
  B. 600 parts by weight of the organosiloxane defined in (A) above, and 90 parts by weight of vinyltriacetoxysilane.
  C. 600 parts by weight of the organosiloxane defined in (A) above, and 120 parts by weight of vinyltriacetoxysilane
  D. 600 parts by weight of the organosiloxane defined in (A) above, and 160 parts by weight of vinyltriacetoxysilane.

The above mixtures contained modified organosiloxane molecules which contained a siloxane unit of the formula $(CH_3COO)_3SiCH_2CH_2(CH_3)SiO$. The mol percentage of such modified organosiloxane molecules in the mixture was 28 for (A), 44 for (B), 59 for (C) and 79 for (D). The mixture (D) separated into two phases, a top layer and a bottom layer. Both layers contained modified organosiloxane molecules.

The following primer compositions were prepared by mixing the ingredients defined below under anhydrous conditions.
  1. 10 parts by weight of acetone  1 part by weight of ethylpolysilicate  1 part by weight of bis(acetylacetonyl) and  1 part by weight of the mixture of (A) above.
  2. Same as (1) above, except methylisobutylketone replaces the acetone.
  3. Same as (1) above, except chlorothene replaces the acetone.
  4. 10 parts by weight of acetone  1 part by weight of ethylpolysilicate  1 part by weight of bis(acetylacetonyl)diisopropyltitanate and  1 part by weight of the mixture of (B) above.
  5. Same as (4) above, except methylisobutylketone replaces the acetone.
  6. Same as (4) above, except chlorothene replaces the acetone.
  7. 10 parts by weight of acetone  1 part by weight of ethylpolysilicate  1 part by weight of bis(acetylacetonyl)diisopropyltitanate and  1 part by weight of the mixture of (C) above.
  8. Same as (7) above, except methylisobutylketone replaces the acetone.
  9. Same as (7) above, except chlorothene replaces the acetone.
  10. 10 parts by weight of acetone  1 part by weight of ethylpolysilicate  1 part by weight of bis(acetylacetonyl)diisopropyltitanate  1 part by weight of the top layer of the mixture of (D) above.
  11. Same as (10) above, except the bottom layer of (D) replaces the top layer of (D).

Each of the above primers were coated on aluminum panels and then with the silicone elastomer as defined in Example 5. The adhesion test procedure used was as defined in Example 6. Two runs of each primer were made, curing the silicone elastomer at room temperature for 48 hours in one case and at 150°C. for one hour in the other case. The adhesion results were as shown in Table VII.

TABLE VII

| Primer | Elastomer Cured At Room Temperature | | Elastomer Cured at 150°C. | |
|---|---|---|---|---|
| | Peel Strength, Pounds | % Cohesive Failure | Peel Strength, Pounds | % Cohesive Failure |
| None | 0 | 0 | 0 | 0 |
| 1 | 20 | 0 | 50 | 0 |
| 2 | 85 | 70 | 95 | 100 |
| 3 | 45 | 0 | 40 | 0 |
| 4 | 85 | 100 | 85 | 50 |
| 5 | 90 | 100 | 85 | 100 |
| 6 | 80 | 100 | 55 | 60 |
| 7 | 50 | 0 | 75 | 50 |
| 8 | 90 | 100 | 80 | 60 |
| 9 | 100 | 100 | 115 | 100 |
| 10 | 40 | 0 | 25 | 0 |
| 11 | 40 | 0 | 80 | 70 |

EXAMPLE 10

The following primer compositions where prepared by combining the ingredients defined below under essentially anhydrous conditions.
  A. 20 parts by weight of acetone  2 parts by weight of ethylpolysilicate,  1 part by weight of bis(acetylacetonyl)diisopropyltitanate, and  2 parts by weight of the mixture of Example 1, (B).
  B. 40 parts by weight of acetone  4 parts by weight of ethylpolysilicate,  1 part by weight of bis(acetylacetonyl)diisopropyltitanate, and  4 parts by weight of the mixture of Example 1, (B).
  C. 80 parts by weight of acetone,  8 parts by weight of ethylpolysilicate,  1 part by weight of bis(acetylacetonyl)diisopropyltitanate, and  8 parts by weight of the mixture of Example 1, (B).

Each of the primers were coated on cleaned aluminum panels and the steel strips by dipping. The silicone elastomer as defined in Example 5 was coated on the primed aluminum panels and cured at room temperature for 48 hours. The adhesion test procedure was the same as defined in Example 6. The adhesion results were as shown in Table VIII.

TABLE VIII

| Primer | Peel Strength, Pounds | % Cohesive Failure |
|---|---|---|
| (A) | 95 | 100 |
| (B) | 80 | 90 |
| (C) | 75 | 70 |

EXAMPLE 11

A mixture was prepared by mixing 100 parts by weight of $[(CH_3)HSiO]_4$, 100 parts by weight methylisobutylketone, 37.5 parts by weight of vinyltriacetoxysilane and a catalytic quantity of a platinum catalyst and heating the mixture for 1.5 hours at 95° to 100°C. under essentially anhydrous conditions. The resulting mixture contained 39 mol percent modified organosiloxane of the formula

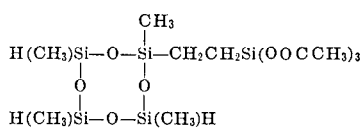

with the remainder being $[(CH_3)HSiO]_4$.

The following primer compositions were prepared by combining the ingredients under essentially anhydrous conditions.

A. 10 parts by weight of methylisobutylketone,
   2 parts by weight of the organosiloxane mixture prepared above, 1 part by weight of ethylpolysilicate, and 1 part by weight of bis(acetylacetonyl)biisopropyltitanate.

B. Same as (A) above, except acetone replaces the methylisobutylketone.

C. Same as (A) above except chlorothene replaces the methylisobutylketone.

Each of the primers were used in testing for adhesion as described in Example 10. The silicone elastomer was cured in one case at room temperature for 24 hours and in another case at 150°C. for one hour. The adhesion results were as shown in Table IX.

TABLE IX

| Primer | Room Temperature Cure | | 150°C. Cure | |
|---|---|---|---|---|
| | Peel Strength, Pounds | % Cohesive Failure | Peel Strength, Pounds | % Cohesive Failure |
| (A) | 50 | 0 | 90 | 40 |
| (B) | 90 | 0 | 90 | 0 |
| (C) | 50 | 0 | 90 | 0 |

That which is claimed is:

1. A mixture under anhydrous conditions consisting essentially of
   A. an organosiloxane having an average of from four to 20 inclusive silicon atoms per molecule, organosiloxane units bonded together through silicon-oxygen-silicon bonds and selected from the group consisting of dimethylsiloxane units, methylhydrogensiloxane units, trimethylsiloxane units and dimethylhydrogensiloxane units, there being present an average of at least three silicon-bonded hydrogen atoms per molecule, and
   B. a modified organosiloxane having an average of from five to 21 silicon atoms per molecule, organosiloxane units bonded together through silicon-oxygen-silicon bonds and selected from the group consisting of dimethylsiloxane units, methylhydrogensiloxane units, $(CH_3COO)_3SiCH_2CH_2(CH_3SiO$ units, trimethylsiloxane units, dimethylhydrogensiloxane units and $(CH_3COO)_3SiCH_2CH_2(CH_3)_2SiO_{0.5}$ units, there being present an average of at least two silicon-bonded hydrogen atoms per molecule and an average of one siloxane unit selected from the group consisting of $(CH_3COO)_3iCH_2CH_2(CH_3)SiO$ units and $(CH_3COO)_3iCH_2CH_2(CH_3)_2SiO_{0.5}$ units, said mixture having from 15 to 80 mol percent modified organosiloxane (B) where (A) and (B) are 100 mol percent.

2. The mixture according to claim 1 in which (B) is present in an amount of from 25 to 80 mol percent where (A) and (B) are 100 mol percent.

3. The mixture according to claim 2 in which (A) is a copolymer having per molecule an average of two dimethylhydrogensiloxane units, three methylhydrogensiloxane units and five dimethylsiloxane units and (B) is a modified organosiloxane of (A) having per molecule an average of one unit selected from the group consisting of $(CH_3COO)_3SiCH_2CH_2(CH_3)SiO$, $(CH_3COO)_3iCH_2CH_2(CH_3)_2SiO_{0.5}$ and mixtures thereof, an average of two units selected from the group consisting of dimethylhydrogensiloxane, methylhydrogensiloxane and mixtures thereof and an average of five dimethylsiloxane units.

4. The mixture according to claim 2 in which (A) is a copolymer having per molecule an average of two trimethylsiloxane units, five methylhydrogensiloxane units and three dimethylsiloxane units and (B) is a modified organosiloxane of (A) having per molecule an average of one $(CH_3COO)_3SiCH_2CH_2(CH_3)SiO$ units, four methylhydrogensiloxane units and three dimethylsiloxane units.

5. The mixture according to claim 2 in which (A) is $\{(CH_3)HSiO\}_4$ and (B) is a modified organosiloxane of (A) having one $CH_3HSiO$ unit replaced by one $(CH_3COO)_3iCH_2CH_2(CH_3)SiO$ unit.

6. A composition under anhydrous conditions consisting essentially of 1 part by weight of bis(acetylacetonyl)diisopropyltitanate, 0.5 to 10 parts by weight of an alkylpolysilicate selected from the group consisting of ethylpolysilicate, propylpolysilicate and mixtures thereof, 0.5 to 10 parts by weight of the mixture in accordance with claim 1 and 5 to 85 parts by weight of an organic solvent selected from the group consisting of ketones, halogenated hydrocarbons and hydrocarbons all having boiling points no greater than 150°C.

7. The composition according to claim 6 in which the alkylpolysilicate is ethylpolysilicate.

8. The composition according to claim 7 in which the organic solvent is acetone.

9. The composition according to claim 7 in which the organic solvent is methylisobutylketone.

10. The composition according to claim 7 in which the organic solvent is chlorothene.

* * * * *